Nov. 3, 1931.   W. H. FARR   1,830,354
WINDSHIELD WIPER
Filed Nov. 16, 1929   2 Sheets-Sheet 1
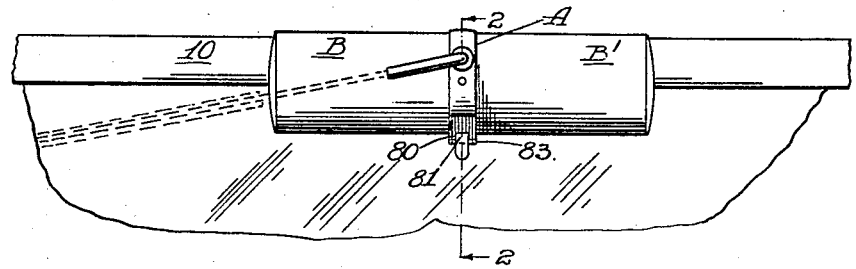
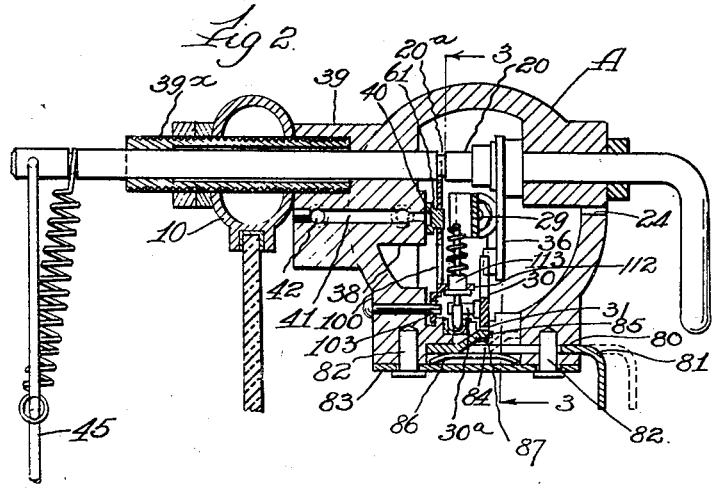
Inventor.
Willard H. Farr.
by Burton & Burton
his Attorneys.

Nov. 3, 1931.  W. H. FARR  1,830,354
WINDSHIELD WIPER
Filed Nov. 16, 1929  2 Sheets-Sheet 2
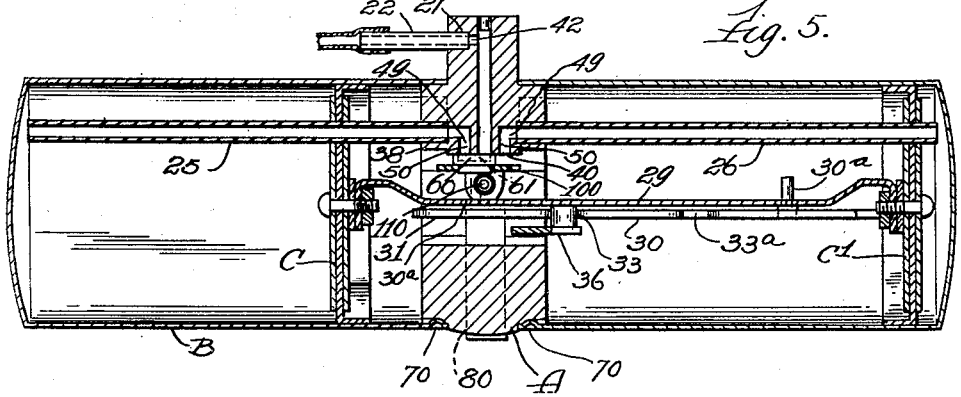
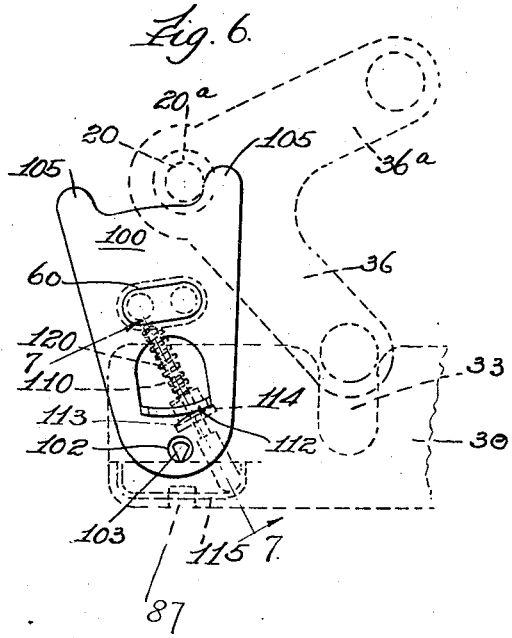
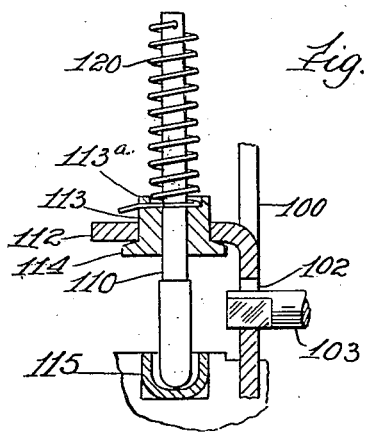
Inventor
Willard H Farr.
by Burton & Burton
his Attorneys.
Witness
N. F. McKnight Patented Nov. 3, 1931

1,830,354

UNITED STATES PATENT OFFICE

WILLARD H. FARR, OF CHICAGO, ILLINOIS, ASSIGNOR TO STEWART-WARNER CORPORATION, OF CHICAGO, ILLINOIS, A CORPORATION OF VIRGINIA

WINDSHIELD WIPER

Application filed November 16, 1929. Serial No. 407,586.

The purpose of this invention is to provide an improved construction of a windshield wiper arranged to be operated by fluid pressure, as engine suction, the invention being particularly directed to the improvement of the valve snap action. It consists in the elements and features of construction shown and described as indicated in the claims.

In the drawings:—

Figure 1 is a rear side elevation of a device embodying this invention.

Figure 2 is a section at the line 2—2 on Figure 1 on an enlarged scale.

Figure 3 is a section at the line 3—3 on Figure 2 on the same enlarged scale, showing the parts at one limit of the piston stroke.

Figure 4 is a similar view showing the parts in the position occupied at the opposite limit of the piston stroke.

Figure 5 is a longitudinally axial section in a plane at right angles to the plane of Figure 3.

Figure 6 is a detail elevation on an exaggerated scale, showing the valve snap action.

Figure 7 is a detail section on a still more exaggerated scale at the line 7—7 on Figure 6.

In the construction illustrated the motor for operating the wiper is of the type having two piston cylinders, each having a closed end and an open end mounted in axial alignment by their open ends at opposite sides of an intermediate mounting member arranged to be secured to the windshield frame and arranged for connection with a source of suction, and having mounted in it the piston-carrying-and-operating parts, fluid connecting passages and ports, valve seat, and valve operating connections, said passages, ports and operating connections serving to control the access of the pressure fluid alternately to opposite sides of the piston members for causing the reciprocation of the piston element. Said mounting member has also a rock shaft actuated by the reciprocation of the piston element and projecting from the casing for carrying the wiper arm and wiper thereon.

Referring to the drawings in detail, the mounting member is seen at A, the two cylinders, B, B¹, having their open ends telescoped on the opposite ends or sides of the intermediate mounting member, A, and, as illustrated, engaged with the latter by bayonet slot connections, as seen at 70.

The mounting member, A, has a connection, seen at 21, for a pipe indicated at 22, leading to the source of suction, and ducts and ports, including an atmosphere port indicated at 24, said connections affording access for suction and atmosphere alternately at opposite sides of the two pistons, C, C¹, in the cylinders, B and B¹, respectively.

The duct connections mentioned include two tubes, 25 and 26, extending from the mounting member, A, longitudinally within the cylinders, B and B¹, respectively, and thus extending through the pistons, C and C¹, respectively, and adapted to serve somewhat as guide bearings for the latter.

The pistons, C and C¹, are shown connected rigidly for simultaneous movement in both directions by a connector, 29, which extends through the mounting member, A; and there is provided rigid with one of the pistons a bar, 30, hereinafter referred to as the piston-actuated bar which engages a guide groove, 31, in the mounting member, and has two notches, 33 and 33ª, arranged for engagement respectively by lever arms, 36 and 36ª, of a rock shaft, 20, which is journaled in the mounting member, A. The mounting member, A, has an interiorly projecting segmental boss, 38, and an exteriorly projecting boss, 39.

The rock shaft, 20, extends out through the boss, 39, and an extension, 39ˣ, which is screwed into said boss and extends through the upper bar, 10, of the windshield frame for mounting the entire structure thereon, and said rock shaft protruding from said extension is arranged at its outer end for carrying the wiper operating arm as seen at 45.

The interior boss, 38, is segmental in form, having a flat face, 40, constituting at a portion thereof a valve seat from which a duct, 41, is formed extending substantially radial with respect to the cylinder in the bosses, 38 and 39, in the latter of which it is intersected by a duct, 42, formed by boring in laterally into said boss, 39, parallel to the axis of the cylinder, whereby a continuous communication is formed through said ducts, 42 and 41, from the outside of the cylinder to said valve seat. A nipple, 22, adapted to receive a small tube telescoped onto it is fitted into a bore, 21, intersecting the end of the duct, 42, said tube serving for connection with a source of suction.

The boss, 38, is bored from opposite sides toward the middle, the bores, 49, 49, stopping short of the duct, 41, and being adapted to receive respectively the tubes, 25 and 26, above mentioned as extending within the cylinders and through the pistons respectively.

From the flat face, 40, of the boss, 38, within what is termed the valve seat area thereof, there are formed at opposite sides of the duct, 41, short ducts, 50, 50, meeting respectively the inner ends of the bores, 49, 49, at which the tubes, 25 and 26 are secured, as mentioned.

For cooperating with said valve seat and with the three ports formed therein as above described, there is provided a valve member, 60, which has in its seating face a recess, 61, having its width substantially equal to the diameter of said ports and its length sufficient to span the middle port and either of the extreme ports, being substantially equal, therefore, to the sum of the diameters of the middle port and the extreme port plus the distance between said ports. For carrying this valve and operating it there is provided a valve shifter, 100, which is lodged against the flat face, 40, said valve shifter being pivoted for its vibratory movement by having near its lower end a circular aperture, 102, by which it is engaged with a pivot pin, 103, set into the mounting member from the exterior, as seen in Figure 2, and having its inner end portion at which it is engaged with the shifter V-shaped in cross section to form a knife edge bearing at the lower side for the shifter, as seen in Figures 6 and 7.

The valve shifter, 100, is dimensioned to extend from its said pivot up into engagement with an annular groove, 20ª, formed in the rock shaft, 20, which is operated by the reciprocation of the pistons, as hereinafter described, in the plane of said shifter; and the upper edge of said shifter is curved in an arc about its pivot with a radius equal to the distance from said pivot to the bottom of said groove in the shaft; so that the shifter vibrating about its pivot is guided and held in its proper plane,—in contact with the flat face, 40,—by its engagement in said groove of the shaft; and for limiting the vibration of the shifter in both directions it has at the opposite limits of its said arcuate upper edge projections, 105, 105, which encounter the shaft at the limits of its opposite movements respectively.

For actuating the valve shifter for shifting the valve to shift the pressure connections from one side to the other of the pistons, there is provided a valve actuator comprising a rod, 110, which extends through a slot, 111, in an arcuate flange, 112, which projects from the opposite face of the valve shifter plate, 100, from that at which it is seated on the flat face, 40, a collar, 113, being provided on said rod dimensioned for sliding in the slot of the flange, said collar having a flange, 114, at its lower end for stopping it against the under side of said arcuate flange, 112. A spring, 120, coiled around the rod, 110, is connected at its lower end to said collar at its upper end to the rod at the upper end of the latter, being stretched between its two points of connections for stressing the collar upwardly against the under side of the arcuate flange when the rod is thrust upwardly by the operation hereinafter described.

The rod, 110, hereinafter referred to as the spring-positioning rod, is stepped at its lower end in a longitudinally extending guideway formed in the lower side of the mounting member, and, as shown, fitted with a channel wear-piece, 115, lodged in the guideway groove of the mounting member. The piston-actuated bar, 30, is furnished at corresponding points near its opposite ends, equally distant respectively from the two pistons, with rigidly projecting abutments which, as shown, are in the form of pins, 30ª, riveted in said bar, 30, these pins being positioned for encounter with the spring-positioning rod, 110, in the opposite piston strokes respectively, a very short distance before the limit of the inward stroke.

The length of the channel guideway for the lower end of the spring-positioning rod is such that when the rod stands at either end of that guideway the rod extending through the collar, 113, and in the lug, 112, of the valve shifter, said rod is in inclined position, as seen in Figures 3 and 4, extending obliquely across a plane directly transaxial with respect to the cylinder intersecting the middle of the three ports over which the valve vibrates; and in this position the stretched spring stressing the flange, 114, of the collar, 113, against the under side of the lug, 112, causes the valve shifter, 100, to be held at the limit of its movement to the opposite side of the said transverse plane from that at which the lower end of the spring-positioning rod is stopped in its guideway. And the valve held by the shifter at that position connects the ports for admitting suction to the cylinder at the end opposite the end of the guideway, 115, at which said rod is stopped for thus positioning the valve. Accordingly, when the piston stroke causes the encounter of the abutment pin, 30ª, with the spring-positioning rod for shifting it to the other end of its guideway, the suction connection is reversed and the suction is admitted to the opposite end of the cylinder, arresting the stroke in the direction which has shifted the valve, and causing the opposite stroke which will reverse the spring-positioning rod and again reverse the valve.

For interrupting the operation by the wiper, at will, and causing the wiper to be held at one limit of its range of vibration over the windshield when the operation is thus interrupted, the mounting member, A, has at its lower side a transverse slideway, 80, for a sliding catch bar, 81, which is guided and checked in said slideway by way of the pins, 82, 82, which secure a cover plate, 83, closing the slideway at the lower side, said pins, 82, engaging a longitudinal slot, 84, in the catch member, 81, said slot being formed in continuation of an aperture formed by striking up from the catch bar, a lug, 85, which thus projects from the upper side of said bar, sloping from the upper surface of the bar up rearwardly, as seen in Figure 2; and a bow-spring, 86, is provided on the catch bar between the same and the cover plate, 83, stressing the catch bar, 81, upwardly against its slide bearing in the mounting member. The piston-actuated bar, 30, which has the pin, 30ª, for operating the valve shifter actuator or spring-positioning rod, 110, is formed with notches, 87, 87, similarly positioned with relation to said pins, 30ª, and adapted by their position and dimensions to be engaged by the catch bar lug, 85, when the catch bar is thrust forward in the slideway to the position shown in full line in Figure 2. And from this figure it may be understood that when the catch bar is drawn rearward to the position shown in dotted line in Figure 2, by reason of the sloping form of the lug, said lug stands entirely rearward of the bar, 30, and consequently is out of the path of movement of said bar, so that the catch bar will not engage the notch.

When the driver desires to stop the operation of the wiper, he may push the catch bar forward at any stage in the reciprocation of the pistons and said bar, 30, in either direction; and it may be understood that if this is done at a point in the stroke at which the notch which is moving toward the catch bar has not arrived at the catch lug, 85, the catch bar will be crowded down in the slideway, the spring, 86, yielding and thereby being conditioned for reaction, so that when in the completion of the stroke the notch arrives at the catch, the latter will be sprung up into engagement with the notch, and the pistons will be locked against movement in either direction. The notches are located so that this engagement with the catch bar occurs at the instant at which the valve has been shifted by the snap action for reversing the suction connection; and accordingly when the locking occurs, the pistons are already under the stress of such reversed movement; and the wiper is held positively at the limit of its normal upward spring under the stress of the lever arm, 36, engaged in the notch, 33, and stressing the shoulder of the notch firmly against the catch lug, 85.

I claim:

1. In a construction for the purpose specified, a snap action valve mechanism comprising a casing member having near one side a shaft bearing, and a rock shaft journalled therein, the casing member having extending in a plane transverse to the shaft a flat face comprising a valve seat; a valve; a valve shifter pivoted toward one end near the opposite side of the casing from that near which the rock shaft is journalled, for vibrating over said flat face and vibrating the valve over said valve seat, the valve shifter having projecting at the side opposite said flat face, a guide flange having a slot extending parallel to the plane of said vibration; an actuator for the valve shifter consisting of a rod extending through said slot, the casing having at the side near which the valve shifter is pivoted, a guideway for the end of said actuator, and a spring mounted for reacting between the actuator rod and the guide flange for stressing the actuator relatively to the shifter toward the pivoted end of the latter, the apparatus having a reciprocating part with abutments arranged to encounter the actuator near its end which is guided in the casing guideway for shifting the actuator along said guideway past the valve shifter pivot.

2. In a construction for the purpose specified, a snap action valve mechanism comprising a casing member having near one side a shaft bearing, and a rock shaft journalled therein, the casing member having extending in a plane transverse to the shaft a flat face comprising a valve seat; a valve; a valve shifter pivoted toward one end near the opposite side of the casing from that near which the rock shaft is journalled, for vibrating over said flat face and vibrating the valve over said valve seat, the valve shifter having projecting at the side opposite said flat face a guide flange having a slot extending parallel to the plane of vibration of the valve shifter; an actuator for the valve shifter consisting of a rod extending through said slot, the casing having at the side near which the valve shifter is pivoted, a guideway for the end of said actuator, and a spring coiled about the actuator rod stopped at one end on the rod and at the other end by the guide flange, the apparatus having a reciprocating part with abutments arranged to encounter the actuator near its end which is guided in the casing guideway for shifting the actuator along said guideway past the valve shifter pivot.

3. In a construction for the purpose indicated, a snap action valve mechanism comprising a casing member having near one side a shaft bearing, a rock shaft journalled therein, the casing member having a valve seat and slideway extending transversely to the shaft; a valve shifter pivoted toward one end near the opposite side of the casing from that near which the shaft is journalled for vibrating at the other end in a plane parallel to said transversely extending slideway; a valve arranged for seating and reciprocating at said slideway, and associated with said valve shifter for being so reciprocated in the vibratory movement of said valve shifter, said valve shifter having projecting from it in a direction transverse to the plane of its vibratory movement a guide flange having a slot extending parallel to its plane of vibration; an actuator for the valve shifter consisting of a rod extending through said slot; the casing having at the side near which the valve shifter is pivoted, a guideway for the end of said actuator, and a spring mounted for reacting between the actuator rod and the guide flange for stressing the actuator relatively to the valve shifter toward the pivoted end of the latter, the apparatus having a reciprocating part with abutments arranged to encounter the actuator near its end which is guided in the casing guideway for shifting the actuator along said guideway past the valve shifter pivot.

4. The construction defined in claim 3, the shaft having an encompassing groove in the plane of vibration of the valve shifter, said shifter being dimensioned for engagement and guidance in said groove in its vibration for shifting the valve along its seat.

5. The construction defined in claim 3, the valve shifter having at its end remote from its pivot projections which extend at opposite sides of the rock shaft, spaced apart for limiting the vibration of the valve shifter relatively to the shaft and valve seat.

6. The construction defined in claim 3, the valve shifter being arranged to carry the valve, the edge of the valve shifter opposite its pivoted end being curved in an arc about the pivot, the radius of said arc being substantially equal to the distance from the valve shifter pivot to the proximate side of the shaft in the plane of the valve shifter; whereby the spring reacting between the actuator and the flange of the valve shifter stresses the valve shifter simultaneously against its pivot and against the rock shaft for accurately positioning the valve with respect to the valve seat.

7. The construction defined in claim 3, the shaft having an encompassing groove in the plane of vibration of the valve shifter, the valve shifter being arranged for carrying the valve and being dimensioned for engagement and guidance in said groove in its vibration for carrying the valve on its seat, the edge of the valve shifter opposite its pivot and which engages said groove of the shaft being curved in an arc about the pivot, the radius of said arc being substantially equal to the distance of the pivot to the bottom of the groove in the shaft, the valve shifter having at the end which thus engages the groove in the shaft, projections which extend at opposite sides of the rock shaft at the limits of its arcuate edge, spaced apart for limiting the vibration of the valve shifter relatively to the shaft and valve seat.

8. In the construction defined in claim 3, a collar on the actuator rod at its engagement in the flange slot, said collar being stopped on the flange at the side of the latter toward the actuator guideway, the spring being stretched between the collar and the end of the actuator rod at the opposite side of the flange from that at which the collar is stopped.

9. In a construction for the purpose specified, a snap action valve mechanism comprising a casing member having near one side a shaft bearing and a rock shaft journalled therein, the casing member having extending in a plane transverse to the shaft a flat face comprising a valve seat; a valve; a valve shifter pivoted toward one end near the opposite side of the casing from that near which the rock shaft is journalled, for vibrating over said flat face and vibrating the valve over said valve seat, said valve shifter having projecting at the side opposite the flat face of the casing a slotted flange; an actuator for the valve shifter consisting of a rod arranged alongside the valve shifter and extending through the slot of said flange, the casing having at the side near which the valve shifter is pivoted, a guideway for one end of said actuator rod; a collar on the rod stopped against the slotted flange at the side toward said guideway, and a stretched spring coiled about said rod secured at one end to the collar and at the other end to the rod at the end of the latter at the opposite side of the flange from that at which the collar is stopped, the apparatus having a reciprocating part with abutments arranged to encounter the actuator near its end which is guided in the casing guideway for shifting the actuator along said guideway past the valve shifter pivot.

In testimony whereof, I have hereunto set my hand at Chicago, Illinois, this 13th day of November, 1929.

WILLARD H. FARR